Dec. 6, 1955  M. D. GORDANIER  2,725,949
MUFFLER FOR INTERNAL COMBUSTION ENGINES
Filed Aug. 15, 1952  2 Sheets-Sheet 1
Fig. 1
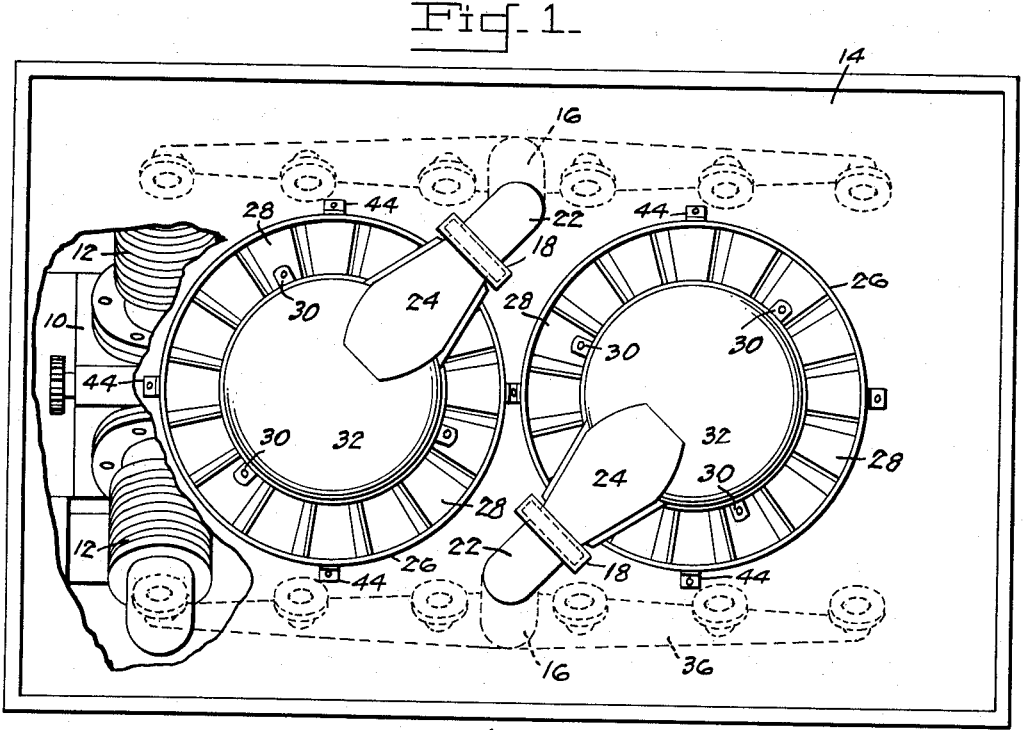
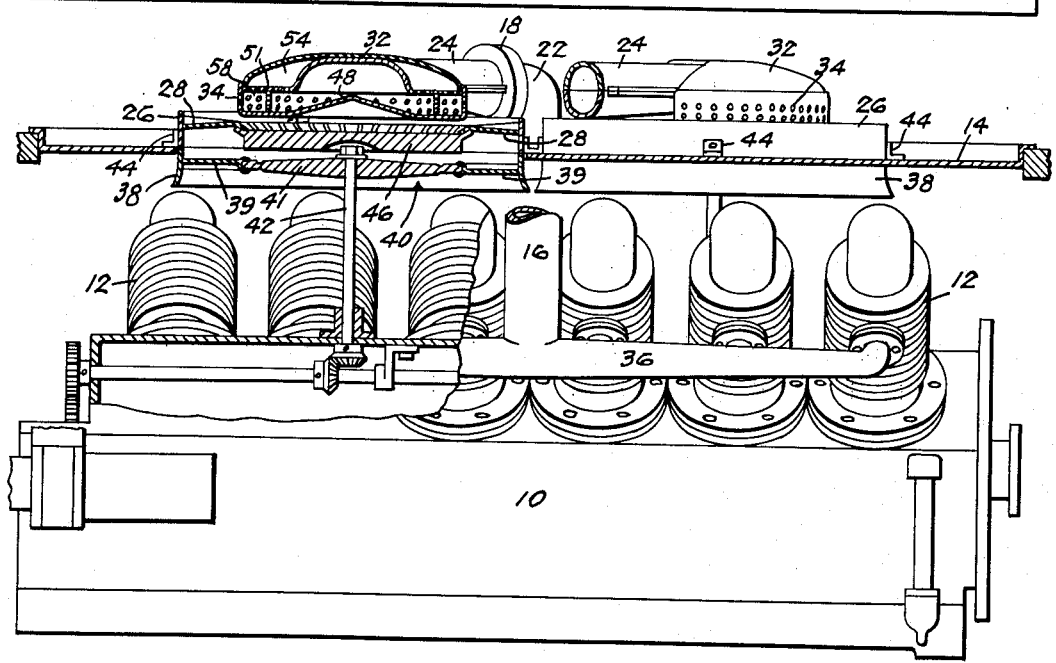
Fig. 2
INVENTOR
Max D. Gordanier
BY W. E. Thibodeau, A. W. Dew
ATTORNEYS
and R. M. Lyon
AGENT Dec. 6, 1955  M. D. GORDANIER  2,725,949
MUFFLER FOR INTERNAL COMBUSTION ENGINES
Filed Aug. 15, 1952  2 Sheets-Sheet 2

INVENTOR
Max D. Gordanier
BY W. E. Thibodeau + A. W. Dew
ATTORNEYS
and R. M. Lyon
AGENT

United States Patent Office

2,725,949
MUFFLER FOR INTERNAL COMBUSTION ENGINES

Max D. Gordanier, Pleasant Ridge, Mich.

Application August 15, 1952, Serial No. 304,667

5 Claims. (Cl. 181—51)

(Granted under Title 35, U. S. Code (1952), sec. 266)

The invention described herein may be used by and for the Government for governmental purposes without the payment of any royalty thereon.

This invention relates to exhaust mufflers for internal combustion engines, and particularly to exhaust mufflers for multi-cylinder internal combustion engines whose cylinders and valves are air-cooled by means of fans or blowers as shown for example in U. S. Patent No. 2,573,544, issued October 30, 1951, to Joseph M. Colby.

It is to be understood that the invention hereinafter described will be useful with any air-cooled internal combustion engine, and although particularly useful with such an engine in a combat vehicle it will be apparent that the application and adaptation of the invention is not thus limited.

One object of this invention is to provide a muffler which may be entirely encompassed within the body of a vehicle or the hull of a combat vehicle.

A further object of this invention is to provide a muffler that will efficiently arrest the flaming exhaust gases.

A still further object of this invention is to reduce, prevent or eliminate the possibility of pin-pointing of the vehicle by ear which heretofore was possible because of a high frequency hum generated by the cooling air fans.

A still further object of this invention is to provide a muffler with relatively low back pressure characteristics.

A further object of this invention is to utilize the engine cooling air for the purpose of cooling the engine exhaust gases.

Other objects and advantages will be more apparent to those skilled in the art from the following description of the accompanying drawings, illustrating one embodiment of my invention, in which:

Figure 1 is a plan view of a V-type air cooled engine covered by an engine cover plate, partly broken away, with two rotary axial flow fans positioned at the top of the engine with the mufflers set upon the top of the fans.

Figure 2 is a side elevation of the same engine partly broken away to show drive mechanism of fan and attachment of muffler.

Figure 3:
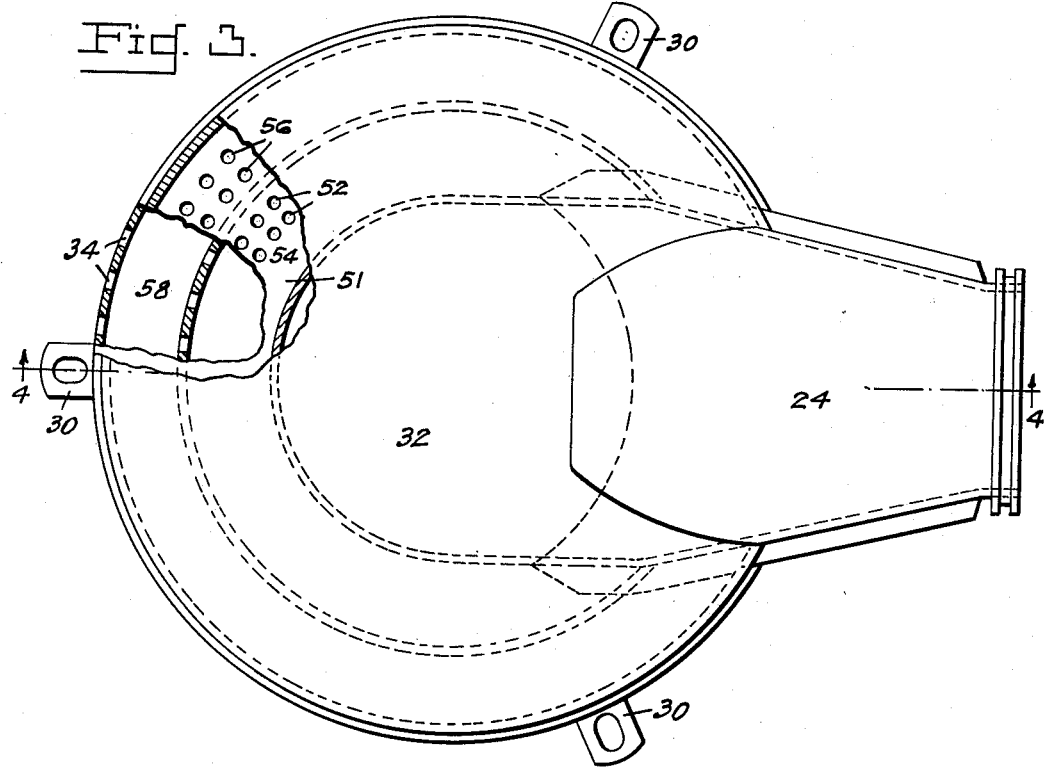
Figure 3 is a detailed sectional elevation view of the muffler.

In the drawings, wherein like numerals refer to similar parts throughout, Figure 1 shows a plan view of an engine 10 covered by an engine cover 14 with a partial cut away to reveal engine cylinders 12. The stationary contra vanes adapted to provide by redirection a straight line flow of air from fan blades 39, are designated as 28 with a shrouding 26 attached circumferentially to the contra vanes. Supports 44 are shown as supporting the shrouding 26 by connection thereto and suitably anchored to the engine cover 14. The plate 46 not shown in Figure 1, to which are attached circumferentially stationary contra vanes 28, is positioned on top the exhaust fans 40, not shown in Figure 1, and top of the plate 46 is located the object of this application, muffler 32, suitably secured in position by brackets 30 attached to stationary contra vanes 28. The inlet spout 24 of the muffler 32 is connected by an elbow 22 to the manifold extension 16 from the engine and properly secured thereto by clamping rings 18.

Figure 2 is a side elevation of the engine 10, partly broken away to show cross section of fan 40 and muffler 32. The muffler 32 shown on the right of Figure 2 shows the exhaust holes 34 placed circumferentially about the muffler. Also shown to the right of the drawing is the manifold extension 16 leading from manifold 36. The section of Figure 2 broken away shows the exhaust fan 40 driven by shaft 42 connected in a suitable manner through a driving mechanism to the engine drive shaft. The fan 40 comprises a relatively large rotary body portion 41 with fan blades 39 integral therewith and extending radially therefrom. Circumferentially surrounding the outer extremities of blades 39 and integral therewith is fan shrouding 38 which directs the flow of air upward through contra vanes 28. The cover plate 46, with stationary contra vanes 28 attached thereto, is set in a hole in the engine cover and is secured thereto by bracket 44 in such a manner that shrouding 26 nearly impinges the top of shrouding 38. The length and position of the stationary contra vanes are such that the vanes cover only the fan blades 39. The muffler 32 is shown as sitting on cover plate 46 and securely fastened to contra vanes 28. The exhaust extension 16 is shown as passing down through the engine cover plate to the exhaust manifold for the opposite bank of cylinders.

Figure 3 is a top sectional view of the muffler showing brackets 30 and position of exhaust ports including ports 34, 52 and 56.

Figure 4:
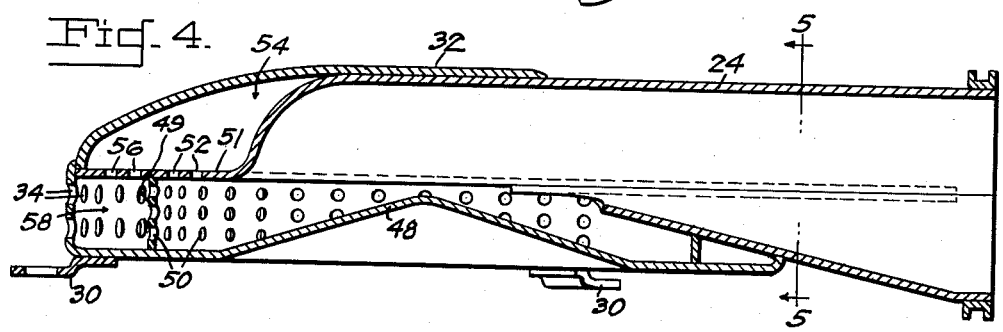
Figure 4 is a sectional view, taken along line 4—4 of Figure 3.
Figure 5:
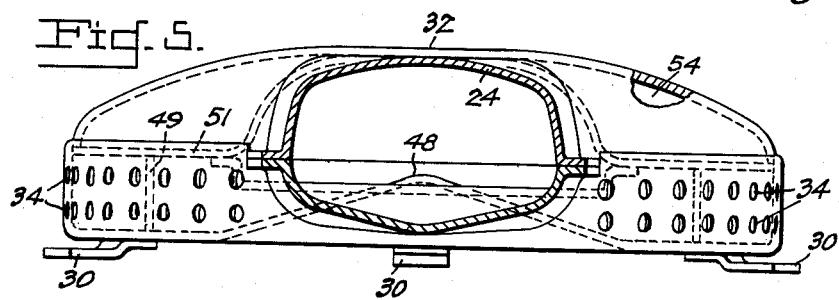
Figure 5 is a sectional view, taken along the line 5—5 of Figure 4.

Figure 4 is a sectional view along the line 4—4 of Figure 3. Shown is cone 48, the vertical baffle 49 with exhaust ports 50, the horizontal baffle 51 with exhaust ports 52 and 56, the tuning chamber 54 above baffle 51, and exhaust chamber 58 formed by baffles 49 and 51 and the exterior circumferential wall of the muffler.

In operation, the exhaust gases from each cylinder 12 will enter the exhaust manifold 36 and be carried by the manifold extension 16 to the muffler inlet spout 24 and hence into the muffler itself. The exhaust gases entering spout 24 will be directed over cone 48 for the purpose of splitting and redirecting the exhaust gases. As seen in Figure 4 the exhaust gases are broken up and pass through holes 50 in baffle 49 into chamber 58. The exhaust gases, to a limited extent may also pass through holes 52 of baffle 51 into tuning chamber 54. However, chamber 54 is used primarily as a tuning chamber and little if any flow of gases pass through the chamber. Chamber 54 in acting as a tuning chamber provides for the expansion and pulsation of the gases which in accordance with well known rules reduces the noise vibrations of the gas. In chamber 54 there are additional holes 56 in baffle 51 for the passage of exhaust gases into chamber 58. The exhaust gases in chamber 58 are exhausted to the atmosphere through holes 34 which further break up the exhaust gases into jets and also aid in additional muffling.

In Figure 2 it will be seen that the air stream generated by the fan blades 39 will be redirected by the stationary contra vanes 28 in a manner causing the air stream to pass vertically past the holes 34 in the muffler. The exhaust gases on leaving holes 34 enter the air stream and are greatly broken up and cooled thus giving three desirable characteristics which are: (1) cooling of the gases to the extent that the flame of exhaust gas is extinguished, (2) muffling is increased by virtue of the rapid expansion and mixing of exhaust gases with the cooling air drowning out high frequency noises and (3) the back-pressure effect of the muffler is lower because rapid flow of cooling air past holes 34 tends to draw the exhaust gases out of chamber 58 through holes 34. The stationary contra vanes provide an additional service in that the air stream is directed in such a manner that a portion of the air after mixing with the exhaust gases passes over the top of the muffler cooling the muffler dome.

Although as described above the operation of the muffler of this invention provides cooling of the exhaust gases to an extent such that flame thereof is extinguished, thus eliminating visibility by reason of such flame, it is also pointed out that in the case of a combat vehicle the usual armored grill (not shown) above the fans, and which would also be above the muffler, would effectively reduce or eliminate any possibility of visibility which might occur in the event any parts of this muffler should possibly become red hot.

As a result of actual comparative operational tests of the muffler of this invention and of heretofore known mufflers, it is concluded that the muffler of this invention provides the following desirable characteristics; it has superior flame arresting qualities, it is capable of handling a larger volume of exhaust gases in proportion to size, it is equal in sound muffling qualities to those heretofore known mufflers employing only the conventional baffle and expansion chamber, it is superior in sound muffling qualities to those heretofore known mufflers using engine cooling air to cool the exhaust gases, and that its thus recited desirable characteristics are greatly enhanced in proportion to increased speed of the engine by reason of a correspondingly greater volume of air being discharged by the fan or fans.

Although certain embodiments of this invention have been shown and described herein, it will be understood that the invention is not to be limited to the exact construction thus shown and described, but that various changes and modifications may be made without departing from the spirit and scope of the invention as defined in the appended claims.

What is claimed is:

1. A device of the character described comprising, in combination, inner and outer concentrically disposed spaced cylindrical members each having a plurality of openings therein, a walled tuning chamber at one of the corresponding ends of said inner and outer cylindrical members, said tuning chamber being in direct communication with the interiors of both of said cylindrical members, an inlet exhaust gas spout adjacent said tuning chamber and in communication with the interior of the inner one of said cylindrical members at said one end thereof, and an imperforate closure member at the other of the corresponding ends of said inner and outer cylindrical members, said closure member having an imperforate conically shaped portion thereof extending from its base and apex portions axially and within confines of said inner cylindrical member and for most of the length thereof respectively from and toward said one and other ends thereof.

2. A muffler for exhaust gases of an internal combustion engine having a horizontally disposed cooling air fan, comprising, in combination, a base member having a wall in the form of a vertically disposed cylinder with a plurality of exhaust port openings therethrough, a baffle member having a wall in the form of a vertically disposed cylinder spaced inwardly and parallel to and within confines of said wall of said base member and with a plurality of openings therethrough, a dome closure member integrally secured to the upper end of said base member, an inlet exhaust spout member on said dome member and in communication through one end thereof with the interior of said baffle member, said spout member at the other end thereof being adapted to be connected to receive said exhaust gases, an imperforate bottom closure member disposed horizontally on said base member, said bottom closure member including a central vertically disposed conical section extending axially upwardly within confines of said baffle member for most of the length thereof, a second baffle member having openings therein secured to said dome member and providing in the latter a tuning chamber portion in direct communication with the interior confines of both said base member and the first mentioned baffle member, and means on said muffler for securing the latter in a horizontal plane above said fan with said vertically disposed cylinders in axial alignment therewith.

3. In combination with a cooling air fan for an air-cooled internal combustion engine, a muffler of the character described comprising an outer perforated cylindrical member in axial alignment with said cooling air fan and with one of its ends disposed radially inward of and in a plane parallel and adjacent to blades of said cooling air fan, an inner perforated cylindrical member concentrically disposed within and spaced from said outer cylindrical member, a tuning chamber at the other end of said outer cylindrical member and in direct communication with both of said cylindrical members, an inlet exhaust gas spout adjacent said other end of said outer cylindrical member and in communication with the interior of said inner cylindrical member, an imperforate wall extending across said one end of said outer cylindrical member, said wall having a conical portion thereof extending within said inner cylindrical member, and means for securing said muffler with said outer cylindrical member thereof in said disposed position adjacent said fan.

4. A device for discharging exhaust gases from an air-cooled internal combustion engine comprising, in combination a fan with a non-functional center section and fan blades operative to draw cooling air across an engine, a muffler having a cylindrical body whose diameter is the same as the non-functional center section of said fan, said muffler positioned above and in the same center vertical plane as said fan, said cylindrical body of said muffler being covered by and secured to a dome-like structure with gas exhaust inlet spout integral therewith, and exhaust ports circumferentially placed about the cylindrical body of said muffler operative to discharge the exhaust gases directly into the air stream from said fan.

5. A device for discharging exhaust gases of an air-cooled internal combustion engine, said device comprising in combination a horizontally disposed fan having a relatively large non-functional center section with fan blades integral therewith and extending radially therefrom, fan shrouding means circumferentially surrounding and integral with said fan blades, a contra vane assembly of the same relative construction as said fan construction and stationarily disposed above and in the same center vertical plane as said fan, a muffler disposed above and in the same center vertical plane as said contra vane structure, said muffler having a cylindrical body of the same diameter as the fan center section, exhaust ports located circumferentially about said muffler body, said cylindrical body being constructed with a dome at one end thereof, and an inlet spout in connected communication at one end thereof with said muffler dome, said inlet spout through its opposite end being adapted to convey exhaust gases from the engine.

References Cited in the file of this patent

UNITED STATES PATENTS

| 851,490 | Brishen | Apr. 23, 1907 |
| 1,949,667 | Transiskus | Mar. 6, 1934 |
| 2,112,534 | Keen | Mar. 29, 1938 |
| 2,138,510 | Rauen | Nov. 29, 1938 |
| 2,196,920 | Hoyle | Apr. 29, 1940 |